A. L. MONAGHAN.
PLUG FOR REPAIRING HOSE.
APPLICATION FILED OCT. 17, 1907.
908,876.
Patented Jan. 5, 1909.
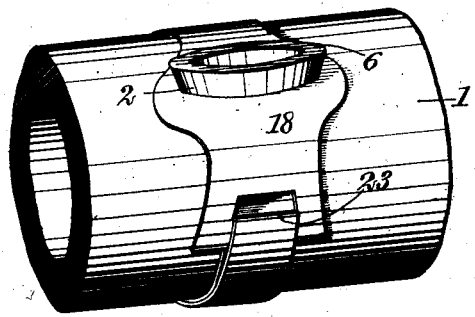
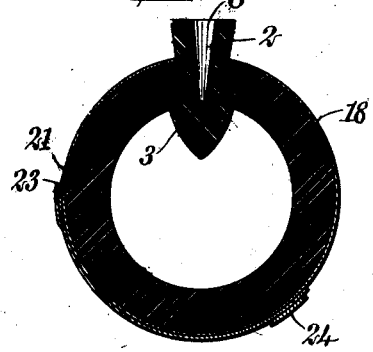
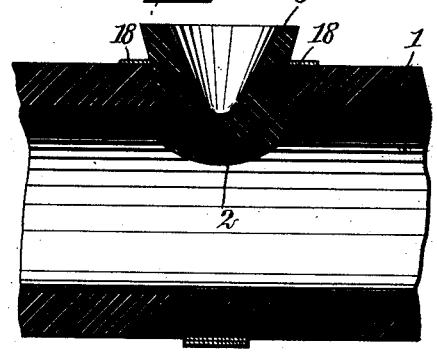
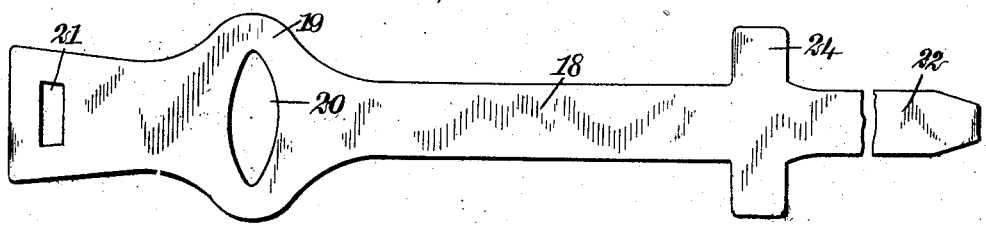
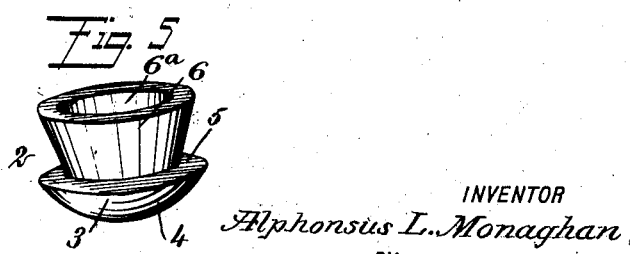
WITNESSES
M. Gartner
F. D. Ammen
INVENTOR
Alphonsus L. Monaghan
BY
Munn & Co.
ATTORNEYS

UNITED STATES PATENT OFFICE.

ALPHONSUS LEGOURI MONAGHAN, OF HOUSTON, TEXAS.

PLUG FOR REPAIRING HOSE.

No. 908,876.    Specification of Letters Patent.    Patented Jan. 5, 1909.

Application filed October 17, 1907. Serial No. 397,786.

*To all whom it may concern:*

Be it known that I, ALPHONSUS L. MONAGHAN, a citizen of the United States, and a resident of Houston, in the county of Harris and State of Texas, have invented a new and Improved Plug for Repairing Hose, of which the following is a full, clear, and exact description.

This invention relates to the repairing of hose of all kinds such as oil hose, steam hose, or hose for air, water, etc.

The object of the invention is to produce a plug of improved form which is especially adapted for repairing a puncture or perforation in a hose such as that described. More particularly the object is to give the plug a form which will facilitate its introduction into the puncture, and which will operate to insure that the plug will remain in position.

The invention consists in the apparatus and in the process to be described more fully hereinafter and particularly set forth in the claims.

Before proceeding to a detailed description of the parts, it will facilitate the disclosure to state at the outset that, in the practice of the invention, at the point where a puncture or rupture has occurred, I form a slit or opening which is of sufficient size to admit a plug of a special form. I provide a special device for forming the slot and inserting the plug, and after the plug is inserted, I provide a clamping or reinforcing band which is attached around the hose at the plug, if the condition of the hose appears to necessitate the presence of such a reinforcement.

Reference is to be had to the accompanying drawings forming a part of this specification, in which similar characters of reference indicate corresponding parts in all the figures.

Figure 1 represents a short section of hose which has been repaired according to the present invention, showing the plug in position, together with the aforesaid clamping or reinforcing band; Fig. 2 is a cross section taken through the hose at the plug as illustrated in Fig. 1; Fig. 3 is a longitudinal section taken through the section of hose at the plug; Fig. 4 is a plan showing the reinforcing band lying flat or "developed" upon the flat surface, a portion of the band being broken away; and Fig. 5 is a perspective of a plug such as used in practicing the invention.

Referring more particularly to the parts, 1 represents the portion of hose supposed to have been repaired. At the puncture or ruptured point, a plug 2 is inserted in the manner to be described hereinafter. The form of this plug is most clearly illustrated in Fig. 5; it is of elongated or lozenge form, having an elongated head 3, presenting a convex under side or crown 4 and an annular shoulder 5 passing continuously around the oval-shaped body 6 of the plug. This body 6 has the form of a flattened cone; that is, it enlarges toward its upper end or butt end, as illustrated in Fig. 5. In this way the plug is made to present an elongated or major axis and a reduced or minor axis at right angles thereto.

In many cases a hose repaired as described will be sufficiently strong, but if the wall of the hose at the punctured point is weak or unsound, I apply to the hose a reinforcing band 18. This band is formed of an elongated strip of light sheet metal having the form illustrated in Fig. 4; at a suitable point it presents an enlargement 19 having a lozenge-shaped opening 20 which is adapted to receive the body of the plug, as illustrated in Fig. 1. At one end the strip is formed with an eye 21, and at the other end with a tongue 22 which is adapted to be passed through the eye and bent back upon itself, as illustrated at 23 in Fig. 1. Near the bending point of the tongue 22, the band is provided with laterally projecting ears 24, which are adapted to be folded down upon the tongue, as illustrated most clearly in Fig. 2. In this way the band may be fitted and clamped close to the outer surface of the hose at the ruptured point, and constitutes a substantial reinforcement for the wall. It also tends to prevent any displacement of the plug if it tends to become loose.

Special attention is called to the fact that after the plug is applied as illustrated in Fig. 3, its outer portion being of enlarged diameter tends to prevent any tendency of the plug to work inwardly in the opening. Special attention is called, also, to the fact that the plug is not of great width when measured circumferentially of the hose, and hence it can be applied to hose of small diameter having great curvature. The plugs will, of course, vary in diameter to suit the kinds of hose with which they are used.

Special attention is called to the conical form of the cavity 6$^a$ in the conical body of the plug and to the manner in which the bottom of this cavity affords a point for the application of the inserting tool receiving all the thrust. The conical form of the cavity favors the inward collapsing of the wall of the body of the plug, which is incident to the insertion of the plug. Attention is also directed to the fact that the thickness of the wall of the body of the plug decreases toward its upper portion or that toward the end which is remote from the holes. In this way I give sufficient mass and thickness to the reduced part of the cone which is disposed in the opening or puncture, and at the same time the outer part of the wall is flexible enough to collapse freely in inserting the plug. The plug is inserted by means of a flat tool having a blunt point.

Having thus described my invention, I claim as new and desire to secure by Letters Patent:

1. A plug for a punctured hose having a conical body with an enlarged head at the reduced end thereof adapted to be forced through the puncture, said body having an enlarged conical cavity formed in the large end thereof extending inwardly toward said head, the bottom of said cavity being unobstructed and adapted to receive the entire thrust of the inserting tool, said cavity forming a space between the inserting tool and the wall of said head.

2. A plug for a punctured hose having a conical body with an enlarged head at the forward reduced end of said body, said body having a conical cavity extending into the same from the large end thereof and forming a wall for said body decreasing in thickness gradually toward the large end of said body, the bottom of said cavity presenting a continuous unobstructed surface adapted to receive the entire thrust of the inserting tool, the decreasing thickness of said wall enabling the enlarged portion of said body to collapse inwardly in inserting said plug, said conical cavity forming a space between the wall of said plug and the inserting tool permitting the inward collapse of said wall.

In testimony whereof I have signed my name to this specification in the presence of two subscribing witnesses.

ALPHONSUS LEGOURI MONAGHAN.

Witnesses:
W. C. LANE,
J. A. BEELER.